US009547802B2

(12) United States Patent
Tseng et al.

(10) Patent No.: US 9,547,802 B2
(45) Date of Patent: Jan. 17, 2017

(54) SYSTEM AND METHOD FOR IMAGE COMPOSITION THEREOF

(71) Applicant: INDUSTRIAL TECHNOLOGY RESEARCH INSTITUTE, Hsin-Chu (TW)

(72) Inventors: Kun-Lung Tseng, New Taipei (TW); Wei-Jia Huang, Nantou County (TW); An-Chun Luo, Taichung (TW)

(73) Assignee: INDUSTRIAL TECHNOLOGY RESEARCH INSTITUTE, Hsin-Chu (TW)

( * ) Notice: Subject to any disclaimer, the term of this patent is extended or adjusted under 35 U.S.C. 154(b) by 330 days.

(21) Appl. No.: 14/261,211

(22) Filed: Apr. 24, 2014

(65) Prior Publication Data

US 2015/0187140 A1    Jul. 2, 2015

(30) Foreign Application Priority Data

Dec. 31, 2013  (TW) .............................. 102149265 A

(51) Int. Cl.
*G06K 9/46* (2006.01)
*G06T 15/50* (2011.01)
*G06T 17/00* (2006.01)
*G06T 7/20* (2006.01)
*G06K 9/00* (2006.01)

(52) U.S. Cl.
CPC ............... *G06K 9/4604* (2013.01); *G06T 7/20* (2013.01); *G06T 15/503* (2013.01); *G06T 17/00* (2013.01); *G06K 9/00335* (2013.01); *G06K 9/00369* (2013.01); *G06T 2207/10028* (2013.01);

(Continued)

(58) Field of Classification Search
CPC .. G06T 2207/10028; G06T 7/20; G06T 17/00; G06K 9/00201–9/00214; G06K 9/00335; G06K 9/00369; G06K 9/4604
See application file for complete search history.

(56) References Cited

U.S. PATENT DOCUMENTS 5,471,541 A    11/1995  Burtnyk et al.
6,940,538 B2    9/2005  Rafey et al.
(Continued)

FOREIGN PATENT DOCUMENTS

CN    101465957 A    6/2009
TW    201205211 A    2/2012
TW    201324383 A    6/2013

*Primary Examiner* — Michelle L Sams
(74) *Attorney, Agent, or Firm* — Locke Lord LLP; Tim Tingkang Xia, Esq.

(57) ABSTRACT

This disclosure provides an image composition system and its method. The system includes: an image capturing unit configured for capturing at least one first image of a real object; a depth information generating unit disposed on the image capturing unit and configured for measuring a depth information between the depth information generating unit and the real object; a computing unit receiving the at least one first image and the depth information, performing the computation of removing a noise caused by a moving object other than the real object from the received depth information, and computing a moving trajectory of the image capturing unit; and a composition unit compositing the at least one first image and a second image of a virtual scene, and display the composited result on a display unit.

13 Claims, 10 Drawing Sheets (a)

(b)

(c)

(d)

(52) U.S. Cl.
CPC ............... *G06T 2207/20076* (2013.01); *G06T 2207/30241* (2013.01); *G06T 2207/30244* (2013.01)

(56) References Cited

U.S. PATENT DOCUMENTS

| | | | |
|---|---|---|---|
| 7,620,202 | B2 | 11/2009 | Fujimura et al. |
| 8,031,906 | B2 | 10/2011 | Fujimura et al. |
| 8,330,796 | B2 | 12/2012 | Schmidt et al. |
| 8,374,423 | B2 | 2/2013 | Lee et al. |
| 8,381,108 | B2 | 2/2013 | Fuller et al. |
| 8,401,242 | B2 | 3/2013 | Newcombe et al. |
| 2003/0043270 | A1* | 3/2003 | Rafey .................... G06T 7/0051 348/157 |
| 2007/0248283 | A1* | 10/2007 | Mack .................... G06T 19/006 382/284 |
| 2007/0286456 | A1 | 12/2007 | Ariyur et al. |
| 2007/0296721 | A1* | 12/2007 | Chang .................... G06T 15/10 345/427 |
| 2011/0052043 | A1* | 3/2011 | Hyung .................... G06T 7/208 382/154 |
| 2011/0102438 | A1* | 5/2011 | Mathe .................... A63F 13/06 345/426 |
| 2011/0150271 | A1 | 6/2011 | Lee et al. |
| 2011/0188708 | A1* | 8/2011 | Ahn .................... G06K 9/00 382/106 |
| 2011/0234481 | A1 | 9/2011 | Katz et al. |
| 2011/0267456 | A1 | 11/2011 | Adermann |
| 2012/0113117 | A1* | 5/2012 | Nakayama ............ G06T 7/0051 345/420 |
| 2012/0113223 | A1 | 5/2012 | Hilliges et al. |
| 2012/0121124 | A1 | 5/2012 | Bammer et al. |
| 2012/0154557 | A1 | 6/2012 | Perez et al. |
| 2012/0177254 | A1 | 7/2012 | Lee et al. |
| 2012/0194517 | A1 | 8/2012 | Izadi et al. |
| 2012/0194644 | A1 | 8/2012 | Newcombe et al. |
| 2012/0196679 | A1 | 8/2012 | Newcombe et al. |
| 2012/0327125 | A1 | 12/2012 | Kutliroff et al. |
| 2013/0075065 | A1 | 3/2013 | Degner et al. |
| 2013/0129155 | A1 | 5/2013 | Lee et al. |
| 2013/0230234 | A1* | 9/2013 | Gurman ............ G06K 9/00201 382/154 |

* cited by examiner

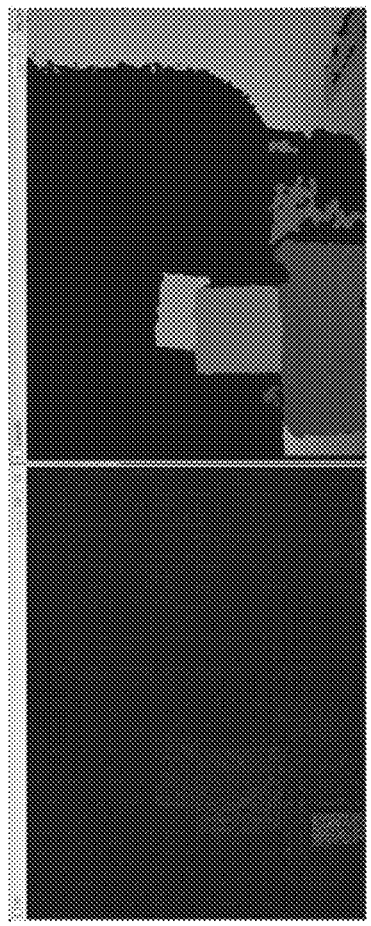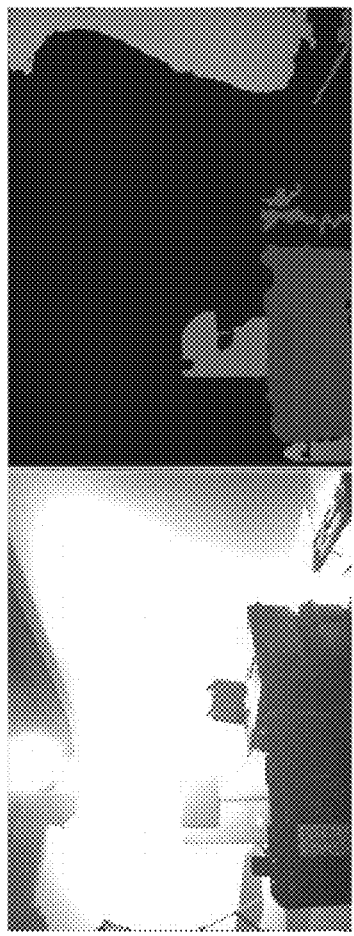
FIG. 3A  FIG. 3B  FIG. 3C  FIG. 3D

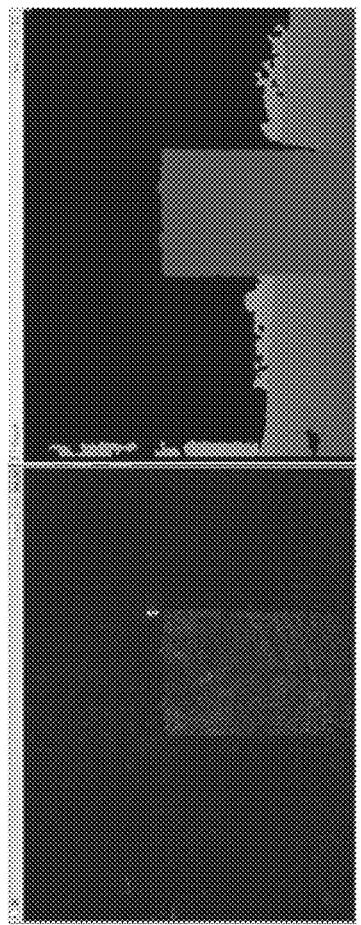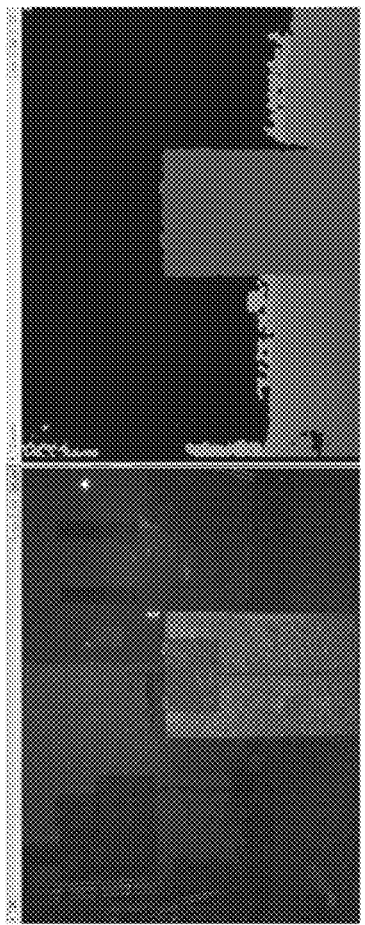
FIG. 4A  FIG. 4B  FIG. 4C  FIG. 4D

SYSTEM AND METHOD FOR IMAGE COMPOSITION THEREOF

CROSS-REFERENCE TO RELATED APPLICATIONS

This application also claims priority to Taiwan Patent Application No. 102149265 filed in the Taiwan Patent Office on Dec. 31, 2013, the entire content of which is incorporated herein by reference.

TECHNICAL FIELD

The present disclosure relates to an image composition method and system, adapted for graphic image composition or stereoscopic image composition.

BACKGROUND

Recently, virtual-real synthesis technology had been commonly applied and seen in all kinds of media, especially in public entertainment media such as movies and commercials. To achieve a perfect virtue-real synthesis, the parameters and the moving trajectory of a camera capturing a real object must register and match exactly to those of a virtual camera in a virtual scene, by that spatial disorientation can be avoided in the composited result of the real object in the virtual scene. Conventionally, the operations for registering and representing real objects in a virtual scene are performed in post-production that can be very tedious and manpower-intensive process. Moreover, if the image information captured is insufficient for reconstructing the camera trajectory in the virtual scene, or even there are errors in parameters registered on-site, the whole image record of the real object will have to be reshot all over again, which can prolong the whole composition production, causing high production cost.

Therefore, it is in need of an improved image composition method and system that not only can reduce the post-production labor cost, but also can prevent the conditions of insufficient trajectory information and erroneous parameter registration at early stage.

SUMMARY

In an exemplary embodiment, the present disclosure provides an image composition system, which comprises: an image capturing unit, configured for capturing at least one first image of a real object; a depth information generating unit, disposed on the image capturing unit and configured for measuring a depth information between the depth information generating unit and the real object; a computing unit, receiving the at least one first image and the depth information, performing a computation of removing a noise caused by a moving object other than the real object from the received depth information, and computing a moving trajectory of the image capturing unit; and a composition unit, compositing the at least one first image and a second image of a virtual scene so as to achieve a composited result while displaying the composited result on a display unit.

In another exemplary embodiment, the present disclosure provides an image composition method, which comprises the steps of: using a moving image capturing unit to capture at least one first image of a real object; using a depth information generating unit disposed on the image capturing unit to measure a depth information between the depth information generating unit and the real object; performing a computation of removing a noise caused by a moving object other than the real object from the depth information according to the at least one first image and the depth information to be used for computing and obtaining a moving trajectory of the image capturing unit; and compositing the at least one first image of the real object and a second image of a virtual scene according to the obtained moving trajectory of the image capturing unit. The depth information generating unit comprises at least one depth camera, and the depth information measured and obtained by the at least one depth camera is substantially a depth map containing information relating to the distance of the surfaces of any two neighboring points on the real object from the depth information generating unit.

Further scope of applicability of the present application will become more apparent from the detailed description given hereinafter. However, it should be understood that the detailed description and specific examples, while indicating exemplary embodiments of the disclosure, are given by way of illustration only, since various changes and modifications within the spirit and scope of the disclosure will become apparent to those skilled in the art from this detailed description.

BRIEF DESCRIPTION OF THE DRAWINGS

The present disclosure will become more fully understood from the detailed description given herein below and the accompanying drawings which are given by way of illustration only, and thus are not limitative of the present disclosure and wherein:

FIG. 3A is an IR image captured by a depth camera of the present disclosure in a condition that the image capturing unit is orientated facing the same direction of the depth camera and the lighting at the film studio is turned off.

FIG. 3B is a depth map computed and obtained from a depth camera of the present disclosure in a condition that the image capturing unit is orientated facing the same direction of the depth camera and the lighting at the film studio is turned off.

FIG. 3C is an IR image captured by a depth camera of the present disclosure in a condition that the image capturing unit is orientated facing the same direction of the depth camera and the lighting at the film studio is turned on.

FIG. 3D is a depth map computed and obtained from a depth camera of the present disclosure in a condition that the image capturing unit is orientated facing the same direction of the depth camera and the lighting at the film studio is turned on.

FIG. 4A is an IR image captured by a depth camera of the present disclosure in a condition that the image capturing unit and the depth camera are orientated facing opposite directions and the lighting at the film studio is turned off.

FIG. 4B is a depth map computed and obtained from a depth camera of the present disclosure in a condition that the image capturing unit and the depth camera are orientated facing opposite directions and the lighting at the film studio is turned off.

FIG. 4C is an IR image captured by a depth camera of the present disclosure in a condition that the image capturing unit and the depth camera are orientated facing opposite directions and the lighting at the film studio is turned on.

FIG. 4D is a depth map computed and obtained from a depth camera of the present disclosure in a condition that the image capturing unit and the depth camera are orientated facing opposite directions and the lighting at the film studio is turned on.

DETAILED DESCRIPTION

Figure 1:
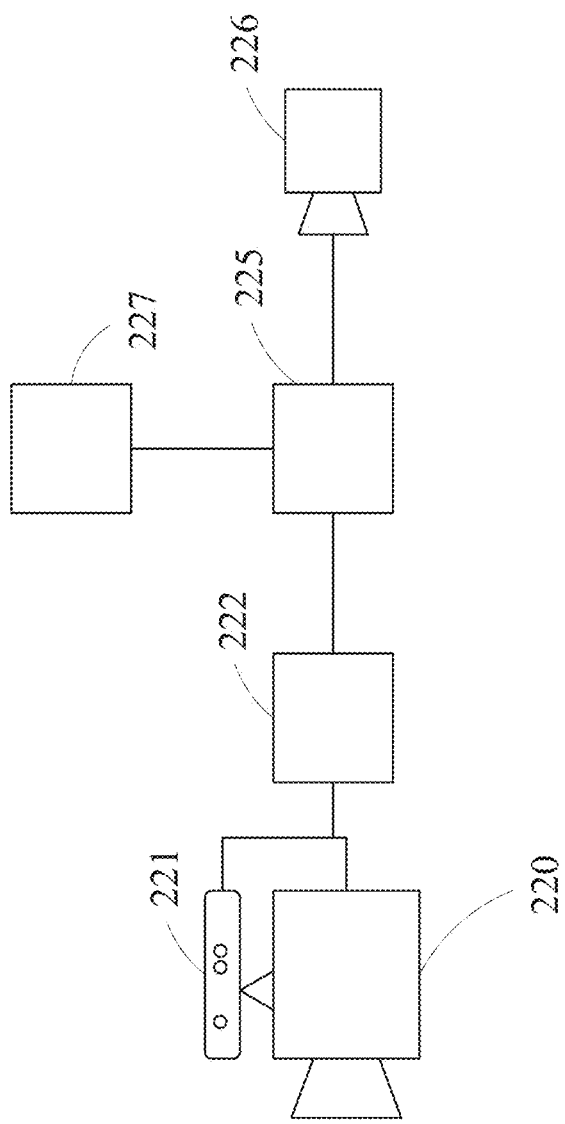
FIG. 1 is a block diagram showing an image composition system according to an embodiment of the present disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

In the following embodiments of the present disclosure, when an element is described to be disposed above/mounted on top of or below/under another element, it comprises either the element is directly or indirectly disposed above/below the other element, i.e. when indirectly, there can be some other element arranged between the two; and when directly, there is no other element disposed between the two. It is noted that the descriptions in the present disclosure relate to "above" or "below" are based upon the related diagrams provided, but are not limited thereby. Moreover, the terms "first", "second", and "third", and so on, are simply used for clearly identifying different elements of the same nature, but those elements are not restricted thereby and must be positioned or arranged accordingly. In addition, the size or thickness of each and every element provided in the following diagrams of the present disclosure is only schematic representation used for illustration and may not represent its actual size.

Please refer to FIG. 1, which is a block diagram showing an image composition system according to an embodiment of the present disclosure. The image composition system 200 of this embodiment can be adapted for two-dimensional image composition or three-dimensional image composition, and comprises: an image capturing unit 220, a depth information generating unit 221, a computing unit 222, a composition unit 225 and at least one virtual camera 226. The image capturing unit 220 is provided for capturing either a single first image or a plurality of first images of a real object, whereas each first image can comprise a moving object other than the real object. It is noted that the first image is the image of the real object captured by the image capturing unit and thus can be referred as a real object image hereinafter. The depth information generating unit 221 can be fixedly mounted to the image capturing unit 220 so as to be used for measuring a depth information between the depth information generating unit and the real object. The computing unit 222, being electrically coupled to the image capturing unit 220 and the depth information generating unit 221, is used for receiving the first image and the depth information to be used for performing a computation of removing a noise caused by the moving object other than the real object from the received depth information, and computing a moving trajectory of the image capturing unit 220. Each of the at least one virtual camera 226, that is electrically coupled to the composition unit 225, is provided for capturing a second image of a virtual scene. That is, the second image is an image of the virtual scene captured by the virtual camera, and thus the second image can be referred as a virtual scene image hereinafter. In addition, the composition unit 225 is electrically coupled to the computing unit 222 and is used for compositing the first image of the real object from the image capturing unit 220 and the second image of the virtual scene from the virtual camera 226 so as to achieve a composited result while displaying the composited result on a display unit 227. Thus, the aforesaid image composition system 200 can be used in either a multimedia production or movie production, since using which information from image capturing unit 220 can be used for enabling camera trajectories to be represented in a virtual scene at the time when the real scene is taken while allowing the representation of the real object to merge into the virtual scene, and thus a preview of virtual-real image composition can be achieved right at the film studio. It is noted that the virtual-real image composition is an image of the virtual scene having the real object merged therein.

The image capturing unit 220 can be a video camcorder, a digital camera of any kind, or even a stereoscope camera, whichever can be used for shooting or capturing image of the real object so as to obtain the first image. In the present embodiment, the image capturing unit 220 is movable and can be enabled to move in a moving trajectory for facilitating a film production. Moreover, the depth information generating unit 221 is fixed to the image capturing unit 220, and thus the spatial relationship between the image capturing unit 220 and the depth information generating unit 221 is fixed without variation. The depth information generating unit 221 can comprise at least one depth camera or a plurality of color cameras. For instance, the depth information generating unit 221 can be a single depth camera, by which the depth information measured and obtained by the depth camera is a depth map containing information relating to the distance of the surfaces of any two neighboring points on the real object from the depth information generating unit 221. In addition, the depth information generating unit 221 can comprised more than two color cameras, using which the angle differences of view between those color cameras are utilized and thus the depth information between those cameras and the real object can be obtained. However, since the field of view of each depth camera is limited by about 57 degrees and the real object is generally being illuminated by high-power lighting in the shooting, the precision of the measured depth map can be adversely affected. Therefore, in order to enlarge the depth measurement range of the depth information generating unit 221, the depth information generating unit 221 in one embodiment of the present disclosure is configured with a plurality of depth cameras that are arranged facing to different directions to be used for generating different depth frames, while enabling the depth frames of those depth cameras to be composed into one depth map. The composition of those depth frames is provided hereinafter.

The computing unit 222 is electrically coupled to the image capturing unit 220 and the depth information generating unit 221 for allowing the same to receive the first image from the image capturing unit 220 and the depth information from the depth information generating unit 221 to be used for computing the moving trajectory of the image capturing unit 220. In this embodiment, the computing unit 222 can be a computer or a field programmable gate array (FPGA) embedded system board, that not only can perform a parameter calibration to the image capturing unit 220, but also can perform the noise/moving object removal based upon the depth information measured and obtained by the depth information generating unit 221 so as to transform the moving trajectory of the depth information generating unit 221 into the moving trajectory of the image capturing unit 220. The abovementioned moving trajectory transformation is provided hereinafter.

The composition unit 225 is electrically coupled to the computing unit 222 for receiving a computation result relating to the moving trajectory of the image capturing unit 220. Moreover, the composition unit 225 is enabled to receive the second image captured by the virtual camera 226 to be used in a composition for merging the images from the image capturing unit 220 into the second image of the virtual camera 226 based upon the computation result relating to the moving trajectory of the image capturing unit 220 so as to achieve the aforesaid virtual-real image composition. It is noted that the second image being a virtual scene image is obtained by the image capturing of the virtual camera 226 upon the virtual scene, whereas the virtual camera 226 is further electrically coupled to the composition unit 225 for enabling the captured virtual scene image to be provided to the composition unit 225. Eventually, the composition unit 225 will transmit the virtual-real image composition of the first and the second images to the display unit 227 for displaying to a user.

Figure 2:
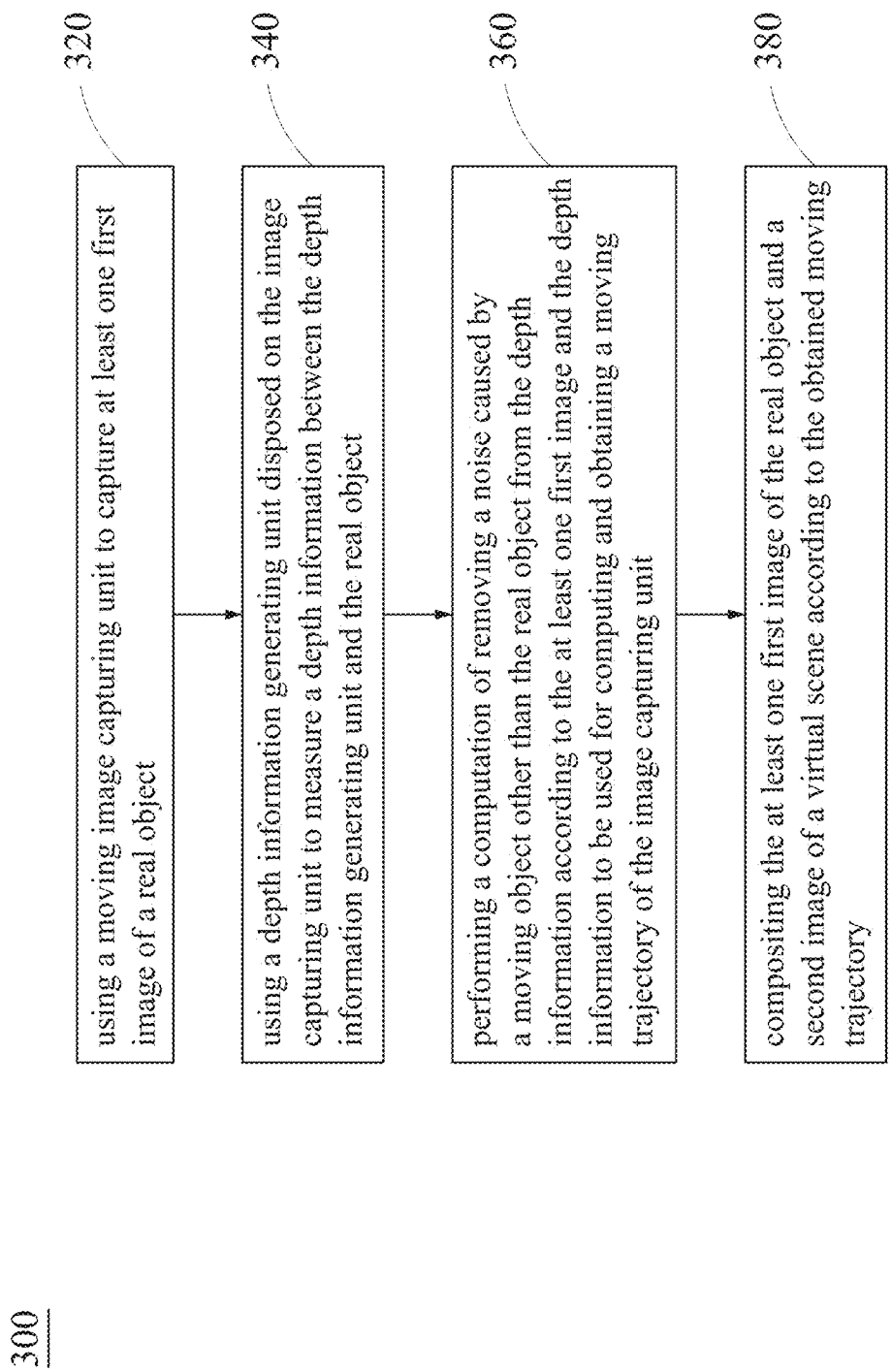
FIG. 2 is a flow chart depicting the steps performed in an image composition method according to an embodiment of the present disclosure.

According to the foregoing image composition system 200, the present disclosure provides an image composition method 300. Please refer to FIG. 2, which is a flow chart depicting the steps performed in an image composition method according to an embodiment of the present disclosure. The image composition method 300 of FIG. 2 comprises the following steps: (step 320) using the moving image capturing unit 220 to capture at least one first image of a real object; (step 340) using the depth information generating unit 221 disposed on the image capturing unit 220 to measure a depth information between the depth information generating unit 221 and the real object; (step 360) performing a computation of removing a noise caused by a moving object other than the real object from the depth information according to the at least one first image and the depth information to be used for computing and obtaining a moving trajectory of the image capturing unit 220; and (step 380) compositing the at least one first image of the real object and a second image of a virtual scene according to the obtained moving trajectory of the image capturing unit. In the embodiment, the image capturing unit 220 can be a video camcorder, a digital camera of any kind, or even a stereoscope camera, whichever can be used for shooting or capturing image of the real object so as to obtain the first image; and the depth information generating unit 221 comprises at least one depth camera, and the depth information measured and obtained by the at least one depth camera is substantially a depth map containing information relating to the distance of the surfaces of any two neighboring points on the real object from the depth information generating unit 221.

The depth camera can be configured with an infrared (IR) source for emitting infrared beam of specific pattern to illuminate a target, and thereby, the depth camera is able to capture an IR image accordingly while calculating and measuring distance of the surfaces of any two neighboring points on of the target from the depth camera based upon time of flight and structure light of the IR beam so as to construct a depth map. The depth map that is a grey-scale image may represent the perpendicular distance between an object and the plane of the scene camera in a manner that the smaller the distance between the target and the camera (the smaller the depth is), the darker it is appeared in the depth map, and vice versa.

Operationally, the depth camera has at least two restrictions. One of which is that during the filming of a movie or a commercial, there can be more than two light sources in the film studio, whereas the intensity of each light source can achieve 5000 watt or more, and consequently the precision of the measured depth map can be adversely affected. Another restriction is that the depth detection capability of each depth camera is limited, whereas generally the range of depth measurement for each depth camera is ranged between 30 cm to 10 m. However, in any common film studio, the scene to be captured can be larger than 20 m or even miles, therefore it might not be possible to represent the moving trajectory directly using the depth map or depth information obtained by the use of depth cameras.

To address the limitations of the depth camera, the present disclosure provides a conversion algorithm, using which for any two objects whose relative positions remain unchanged while a space conversion matrix of the two objects can be obtained, the moving trajectory of one of the two objects can be represented only if the moving trajectory of another object can be acquired. Such conversion can be referred as a conversion matrix calibration. In this embodiment, since the depth information generating unit 221 to fixedly mounted on the image capturing unit 220 for enabling the relative position of the two units to remain unchanged, thus the moving trajectory of the depth information generating unit 221 can be converted into the moving trajectory of the image capturing unit 220 even when the image capturing unit 220 and the depth information generating unit 221 are used for filming different objects or scenes, for instance, in a condition that the image capturing unit 220 is used for capturing a real object that is intensely illuminated by filming lamps while the depth information generating unit 221 is orientated facing an opposite direction or an object that is not being illuminated directly by the filming lamps; or in another condition that the image capturing unit 220 is used for capturing a 20 m long scene while the depth information generating unit 221 is orientated toward a reference object that is disposed nearby. That is, by enabling the image capturing unit 220 and the depth information generating unit 221 to film different objects or scenes in respective, the aforesaid restrictions relating to the depth camera can be solved.

There are two embodiments provided hereinafter, one of which is performed in a condition when the imaging capturing unit 220 and the depth camera are orientated facing toward the same direction for filming a same object, while the other is performed in a condition when the imaging capturing unit 220 and the depth camera are orientated facing opposite directions for filming different objects. FIG. 3A is an IR image taken when the imaging capturing unit 220 and the depth camera are orientated facing toward the same direction and the 5000 W filming lamp in the film studio is not being turned on, while FIG. 3B is the related depth map captured at the same time by the depth camera. In addition, FIG. 3C is an IR image taken when the imaging capturing unit 220 and the depth camera are orientated facing toward the same direction and the 5000 W filming lamp in the film studio is turned on, while FIG. 3D is the related depth map captured at the same time by the depth camera. On the other hand, FIG. 4A is an IR image taken when the imaging capturing unit 220 and the depth camera are orientated facing opposite directions and the 5000 W filming lamp in the film studio is not being turned on, while FIG. 4B is the related depth map captured at the same time by the depth camera. In addition, FIG. 4C is an IR image taken when the imaging capturing unit 220 and the depth camera are orientated facing opposite directions and the 5000 W filming lamp in the film studio is turned on, while FIG. 4D is the related depth map captured at the same time by the depth camera. As shown in FIG. 3A~FIG. 3D and FIG. 4A~FIG. 4D, while operating in the condition that the imaging capturing unit 220 and the depth camera are orientated facing toward the same direction for filming the same object, the intense illumination of the filming lamp will cause adverse affect upon the filming of the depth camera relating to the computation of the depth map, but while operating in the condition that the imaging capturing unit 220 and the depth camera are orientated facing opposite directions for filming different objects, the intense illumination of the filming lamp will not exert any affect upon the filming of the depth camera relating to the computation of the depth map.

Under that condition that the relative positions of the image capturing unit 220 and the depth camera are fixed, when the two are orientated facing toward the same direction, there will be a large portion of their fields of view that are overlapped. However, when the two are orientated facing different directions or even opposite directions, the overlapping will be smaller or even minimized that the image capturing unit 220 and the depth camera can be orientated to take pictures of two different calibration boards that are positioned at different locations. It is noted that the a space conversion matrix between the image capturing unit 220 and the depth camera can be provided according to the following paper: "A Flexible New Technique for Camera Calibration", IEEE Transactions on Pattern Analysis and Machine Intelligence, Vol. 22, 2000, pp. 1330-1334; and "Calibration of Wrist-Mounted Robotic Sensors by Solving Homogenous Transform Equations the Form AX=XB", IEEE Transactions on Robotics Automat., Vol. 7, 1991, pp. 877-878.

Figure 5:
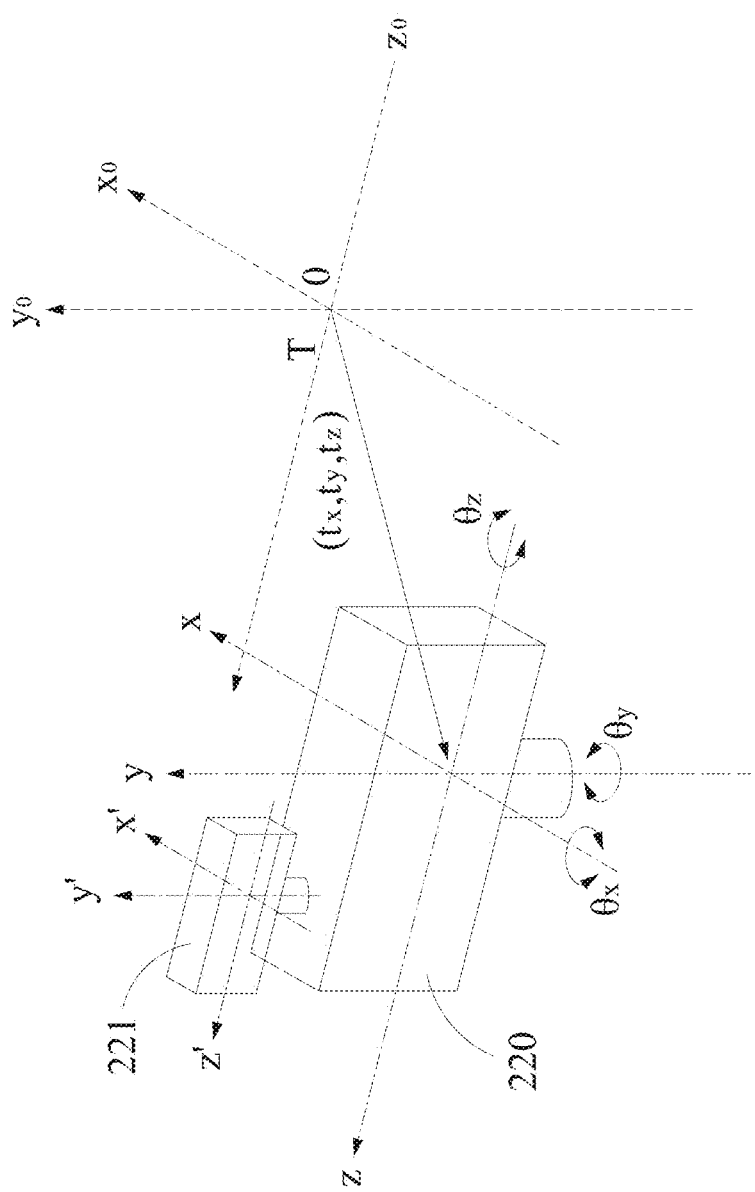
FIG. 5 is a schematic diagram showing the position relationship between an image capturing unit and a depth camera according to an embodiment of the present disclosure.

Please refer to FIG. 5, which is a schematic diagram showing the position relationship between an image capturing unit and a depth camera according to an embodiment of the present disclosure. After a self-positioning operation of the depth camera is completed, its homogeneous transformation matrix P of position and angle can be represented as following:

$$P = \begin{bmatrix} r_{11} & r_{12} & r_{13} & p_x \\ r_{21} & r_{22} & r_{23} & p_y \\ r_{31} & r_{32} & r_{33} & p_z \\ 0 & 0 & 0 & 1 \end{bmatrix}$$

wherein, r represents the rotation-related parameters;
p represents displacement-related parameters;
Consequently, the space conversion matrix M between the image capturing unit 220 and the depth camera 221 can be as following:

$$M = \begin{bmatrix} m_{11} & m_{12} & m_{13} & m_{14} \\ m_{21} & m_{22} & m_{23} & m_{24} \\ m_{31} & m_{32} & m_{33} & m_{34} \\ 0 & 0 & 0 & 1 \end{bmatrix}$$

Thereby, by the multiplication of the matrix P and matrix M, the homogeneous transformation matrix P' of position and angle for the image capturing unit 220 can be obtained, as following:

$$P' = \begin{bmatrix} r'_{11} & r'_{12} & r'_{13} & t_x \\ r'_{21} & r'_{22} & r'_{23} & t_y \\ r'_{31} & r'_{32} & r'_{33} & t_z \\ 0 & 0 & 0 & 1 \end{bmatrix}$$

Let $\theta_x$ represents the rotation angle of the image capturing unit 220 about X axis, $\theta_y$ represents the rotation angle of the image capturing unit 220 about Y axis, and $\theta_z$ represents the rotation angle of the image capturing unit 220 about Z axis, while the displacement of the image capturing unit 220 is represented as $(t'_x, t'_y, t'_z)^T$, thus $r'_{11} = \cos(\theta_y)\cos(\theta_z)$ $r'_{12} = \sin(\theta_x)\sin(\theta_y)\cos(\theta_z) + \cos(\theta_x)\sin(\theta_z)$ $r'_{13} = -\cos(\theta_x)\sin(\theta_y)\cos(\theta_z) + \sin(\theta_x)\sin(\theta_z)$ $r'_{21} = -\cos(\theta_y)\sin(\theta_z)$ $r'_{22} = -\sin(\theta_x)\sin(\theta_y)\sin(\theta_z) + \cos(\theta_x)\cos(\theta_z)$ $r'_{23} = \cos(\theta_x)\sin(\theta_y)\sin(\theta_z) + \sin(\theta_x)\cos(\theta_z)$ $r'_{31} = \sin(\theta_y)$ $r'_{32} = -\sin(\theta_x)\cos(\theta_y)$ $r'_{33} = \cos(\theta_x)\cos(\theta_y)$ Thereby, the rotation angle about the Y axis can be obtained, as following:

$\theta_y = \sin^{-1}(r'_{31})$

Accordingly, $\theta_x = \sin^{-1}(-r'_{32}/\cos(\theta_y))$
$\theta_z = \sin^{-1}(-r'_{21}/\cos(\theta_y))$ Furthermore, in order to obtain a position relating to the origin position of the image capturing unit 22, the calibrated coordinate origin must be subtracted and removed from the equation so as to obtain the position location of the image capturing unit 220, as following:

$$t'_x = t_x - m_{14}$$

$$t'_y = t_y - m_{24}$$

$$t'_z = t_z - m_{34}$$

Then, the rotation angle for the matrix M can be represented as following:

$$\theta_y^M = \sin^{-1}(m_{31})$$

and thus, based upon the foregoing $\theta_y^M$, the following equations can be obtained:

$$\theta_x^M = \sin^{-1}(-m_{32}/\cos(\theta_y^M))$$

$$\theta_z^M = \sin^{-1}(-m_{21}/\cos(\theta_y^M))$$

$$\theta'_x = \theta_x - \theta_x^M$$

$$\theta'_y = \theta_y - \theta_y^M$$

$$\theta'_z = \theta_z - \theta_z^M$$

Accordingly, the moving parameters of the camera, i.e. $t'_x$, $t'_y$, $t'_z$, $\theta'_x$, $\theta'_y$, $\theta'_z$, can be obtained. Thereby, the computing unit 222 is able to compute the position and rotation angle of the depth camera 221 according to the received depth information relating to the depth camera 221 while converting the computed result into the position and rotation angle of the image capturing unit 220.

There are already many camera trajectory tracking techniques available on the market, such as the technique of structure-from-motion for common cameras, the technique of simultaneous localization and mapping (SLAM) for KinecFusion in depth cameras. However, the aforesaid techniques all require the scene to be film to remain still, otherwise the tracked trajectories will be affected by the objects moving in the scene and thus the precision of the tracking will be adverse affected. Therefore, if there is moving object in the scene of the depth camera 221 while it is operating and filming, noises caused by the moving object must be removed. That is, if the depth information or the depth map generated from the depth camera 221 contains noise caused by moving objects other than the target object, the computing unit 222 will be enabled to perform a noise removal computation for removing the noise from the depth information or the depth map.

Figure 6:
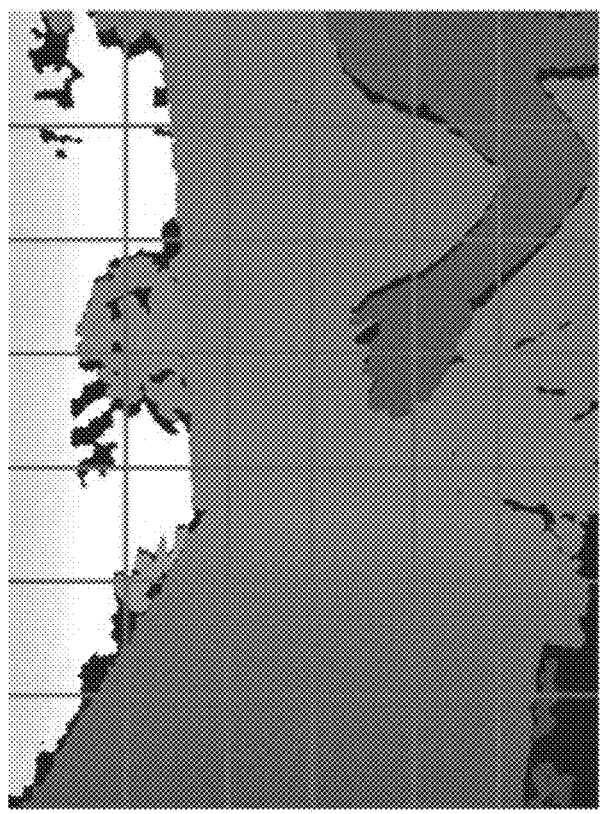
FIG. 6 is a schematic diagram showing a depth map of a depth camera of the present disclosure that is being divided into an array of a plurality of depth frames.

For the removal of the aforesaid noise, an algorithm of Random Sample Consensus (RANSAC) is used in an embodiment of the present disclosure, which comprises the steps of: (step 410) dividing the depth map of the depth camera into an array of a plurality of depth frames, such as the 6×7 array of 42 depth frames shown in FIG. 6; (step 420) randomly excluding the depth frames with distances of the surfaces of the real object from the depth camera 221 that are smaller than a specific threshold; (step 430) randomly sampling more than one depth frames from those depth frames that are not excluded to be used for computing a trajectory variation of the depth camera 221; (step 440) using the trajectory variation of the depth camera 221 in a calculation for comparing the consistency between the moving trajectory of the depth camera 221 and the depth information contained in the depth map; and (step 450) repeating the foregoing steps 410 to 440 for a specific number of times; (step 460) acquiring one set of sampling of the depth frames in step 430 with optimal consistency to be used for computing the moving trajectory of the depth camera 221.

In another embodiment where a three-axis accelerometer is used to detect the initial trajectory variation of the depth camera 221, the initial trajectory variation is used in the aforesaid steps 410~430 and then the step 440 is performed for excluding depth pixels that are inconsistent to the trajectory while adopting the depth pixels that are consistent in a computation for computing the moving trajectory of the depth camera 221.

In addition, for the removal of the aforesaid noise, high-hierarchy image information, such as a human skeleton model and scene model, is used for developing a human skeleton detection method and a spatial temporal attention analysis method, whereas the spatial temporal attention analysis is based upon the paper: "Automatic Change Detection of Driving Environments in a Vision-Based Driver Assistance System, IEEE Transactions on Neural Networks, Vol. 14, No. 3, 2003. The aforesaid two methods can be combined and used in the removal of noises caused by moving objects from the detected depth information prior to the inputting of the depth information into a spatial-temporal merging system, so that the detection of moving trajectory of the image capturing unit 220 is prevented from being interfered by moving objects in the images to be captured, and thus the precision of the resulting spatial-temporal merging in the spatial-temporal merging system is enhanced. It is noted that the spatial temporal attention analysis method is specialized in the removal of objects that are moving constantly in the filming scene, such as a grass being blown to move by wind; and the human skeleton detection method is specialized for addressing the condition where there are characters or actors interacting in the filming scene, by that error caused by a sudden move from an originally motion-less character in the scene, or a moving character in the scene suddenly becoming still. According to an experimental result, there can be about 40% of the noise causing by moving object can be removed by the aforesaid methods, while simultaneously the operation stability of the whole system can be ensured. The removal of noise performed in the present disclosure comprises the steps of: (step 610) obtaining a skeleton model of a figure from the depth map while removing the area where the skeleton model existed from the depth map; and (step 620) utilizing the depth maps generated at different times to extract and remove the areas relating to the moving object.

Figure 7:
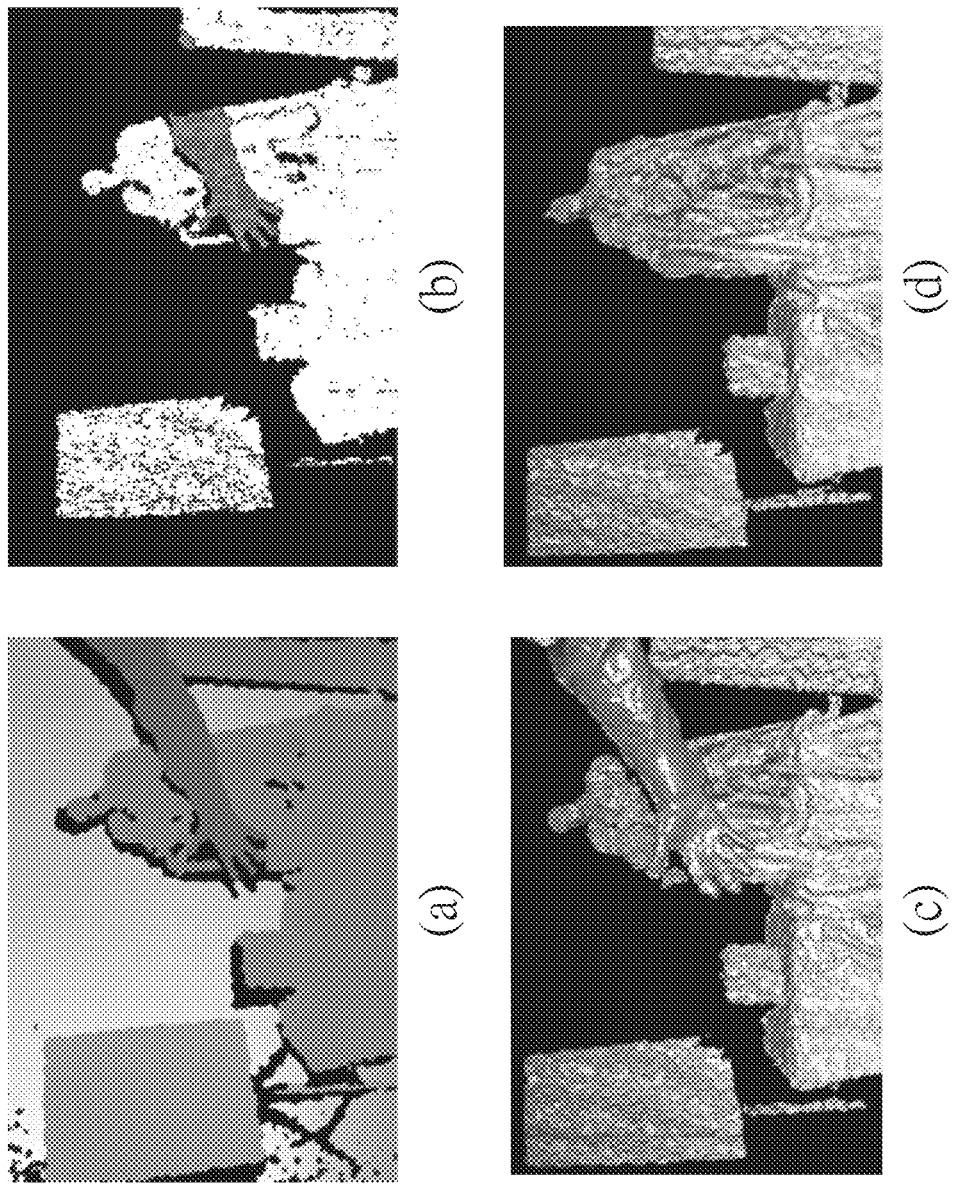
FIG. 7 contains exemplary images of the present disclosure that is obtained using a spatial temporal attention analysis.
Figure 8:
FIG. 8 contains exemplary images of the present disclosure that is obtained using a human skeleton detection method.
Figure 8:
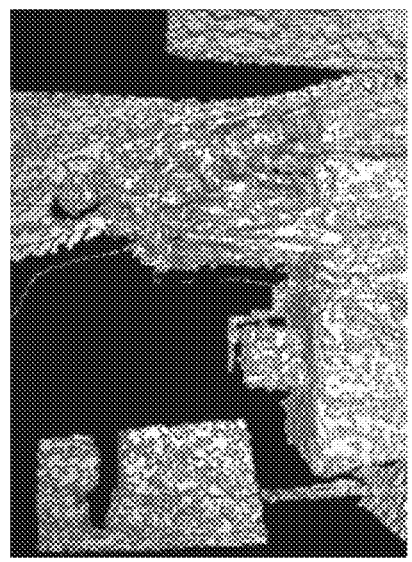
Figure 8:
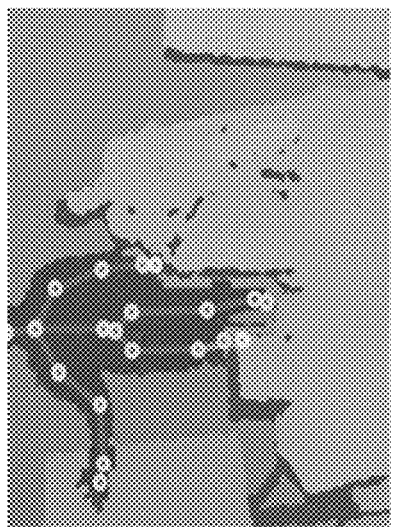
Figure 8:
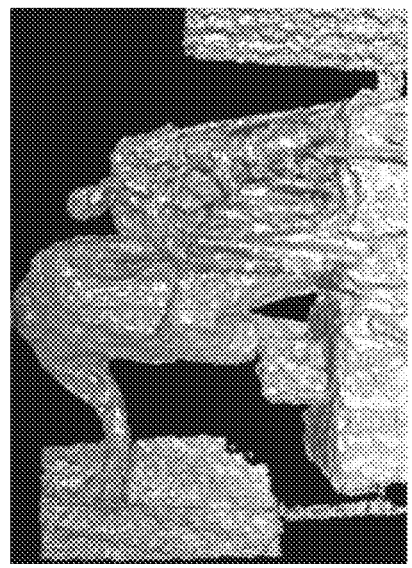

Please refer to FIG. 7, which contains exemplary images of the present disclosure that is obtained using a spatial temporal attention analysis. FIG. 7(a) contains depth information with swinging arms; FIG. 7(b) is a result of spatial temporal attention analysis for detecting the swinging arms; FIG. 7(c) is a result of spatial-temporal merging without the exclusion of the swinging arms; and FIG. 7(d) is a result of spatial-temporal merging with the exclusion of the swinging arms. Please refer to FIG. 8, which contains exemplary images of the present disclosure that is obtained using a human skeleton detection method. FIG. 8(a) is a depth information containing a human character; FIG. 8(b) is a result of human skeleton detection; FIG. 8(c) is a result of spatial-temporal merging without the exclusion of the human character; and FIG. 8(d) is a result of spatial-temporal merging with the exclusion of the human character.

Moreover, the self-positioning of the depth camera can be performed based upon the KinetFusion technique by Microsoft, in "KinecFusion: Real-Time Dense Surface Mapping and Tracking", in Proceedings of the 24$^{th}$ Annual ACM Symposium on User Interface Software and Technology, 2011, pp. 559-568, and thus will not be described further herein. Thereby, the position of the depth camera in each and every depth map can be acquired accurately while allowing the 3D model of the film studio to be constructed simultaneously. Consequently, by the use of the KinectFusion technique and the aforesaid noise removal methods, a precise moving trajectory of the depth camera 221 can be acquired that is freed from interference of any undesired moving objects. After applying the moving trajectory of the depth camera 221 in the aforesaid space conversion matrix, the moving trajectory of the image capturing unit 220 can be obtained.

Generally, the resolution of depth camera is lower than the image capturing unit 220. In an embodiment of the present disclosure, the resolution of the depth camera is 640×480 or lower, while the resolution of the filming camcorder or camera can achieve 4K, 5K or even higher. However, due to the resolution difference between the depth camera 221 and the image capturing unit 220, there can be alignment error being induced between the moving trajectory resulting from the computation of the depth camera 221 and the actual image from the image capturing unit 220. Therefore, a method is used in the present disclosure for solving the alignment error, which is a conventional technique based upon the paper: "MonoSLAM: Real-Time Single Camera SLAM", in IEEE Transactions on Pattern Analysis and Machine Intelligence, Vol. 29, Issue 6, 2007, pp. 1052-1067. Thereby, the moving trajectory of the image capturing unit 220 can be optimized according to the following steps: (step 510) computing and obtaining the moving trajectory of the depth camera 221 based upon the measured depth information, and after setting the moving trajectory as an initial value of a feature tracking algorithm, enabling the feature tracking algorithm to be executed; (step 520) extracting a plurality of feature points from each of the at least one first image that is captured by the image capturing unit 220 to be used in a comparison for obtaining the corresponding relationship between the plural feature points in any two of the at least one first image; and (step 530) calibrating the moving trajectory of the image capturing unit 220 based upon the obtained corresponding relationship. Accordingly, first, the moving trajectory outputted from the depth camera 221 is set to be an initial value to be inputted to an extended Kalman filter (EKF) for updating the position status of the depth camera 221. Thereafter, after extracting feature points from the image that is captured by the image capturing unit 220, the feature points are used in a comparison for obtaining the corresponding relationship between the plural feature points in any two frames, by that the updated position status of the image capturing unit 220 from the EKF is calibrated by the use of the corresponding relationship for enhancing alignment precision.

In order to be able to see in real time the composite results of real images and virtual scenes during the multimedia production process or movie production process, an image composition interface, i.e. Maya developed by Autodesk Ltd., is adopted in the present disclosure. Thereby, all the images and information of the image capturing unit 220 are fed to Maya through its internal memory, and the coordinate system of the virtual camera 226 is positioned matching to the coordinate system of the image capturing unit 220 for facilitating the tracking process of the moving trajectory. After the corresponding relationship between the real object image in Maya and the virtual scene image is determined, the virtual camera 226 can be controlled by a user by controlling the input information of the image capturing unit 220 and thus the user is able to see the result in real time through a preview system provided by Maya. Furthermore, if the image capturing unit 220 and the virtual camera 226 are both 3D stereoscopic cameras, a 3D real-time monitoring operation can be achieved by Maya since the 3D video signals from the image capturing unit 220 and virtual camera 226 as well as the information of the image capturing unit 220 can be inputted to a stereoscopic camera module of Maya in a synchronization manner.

Operationally, in the embodiment of the present disclosure, the operation and the moving trajectory of the virtual camera 226 can be adjusted according to the computing result of the moving trajectory of the image capturing unit 220, so that the virtual camera 226 is enabled to capture a virtual scene that is matching to the real object captured by the image capturing unit 220. Wherein, the moving trajectory and the related operation parameters comprise: spatial positioning in XYZ-axis, rotation angle in XYZ-axis, focal length, negative plate size and resolution, and so on. If there are a plurality of virtual cameras used in one embodiment of the present disclosure, the operation parameters can comprise: inter-axial and convergence between virtual cameras, by that the result of virtual-real image composition can be optimized.

In another embodiment when the virtual scene image is provided and obtained from more than two virtual cameras, similarly, the operation and the moving trajectory of those virtual cameras can all be adjusted according to the computing result of the moving trajectory of the image capturing unit 220, whereas the related operation parameters comprise: spatial positioning in XYZ-axis, rotation angle in XYZ-axis, focal length, negative plate size, resolution, inter-axial and convergence between virtual cameras, and so on, which are similar to the abovementioned embodiment and thus will not be described further herein.

Figure 9:
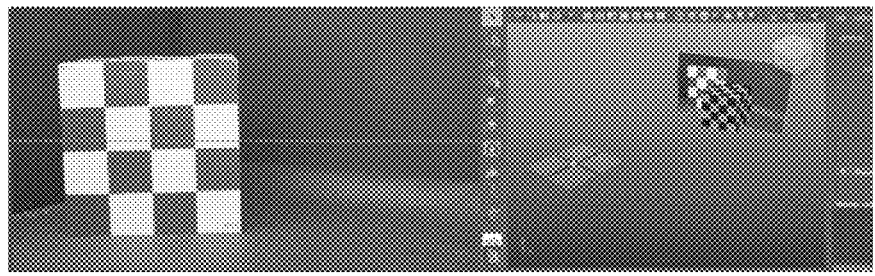
FIG. 9 shows images of a real object captured by an imaging capturing unit of the present disclosure, virtual scenes generated from a virtual camera of the present disclosure, composite results of the real image and the virtual scene and real-time tracking results of the image capturing unit of the present disclosure.

Please refer to FIG. 9, which shows images of a real object captured by an imaging capturing unit of the present disclosure, virtual scenes generated from a virtual camera of the present disclosure, composite results of the real image and the virtual scene and real-time tracking results of the image capturing unit of the present disclosure, that are all produced in a condition when the image capturing unit 220 and the depth camera 221 are orientated facing the same direction. FIG. 9(*a*) shows an image of a real object captured by the imaging capturing unit 220 of the present disclosure; FIG. 9(*b*) shows an image of shows an image of a virtual scene generated from the virtual camera 226 of the present disclosure; FIG. 9(*c*) shows an image of a composite result of the real image and the virtual scene, referring as example 1; FIG. 9(*d*) shows a real-time tracking results of the image capturing unit 220 of the present disclosure in example 1; FIG. 9(*e*) shows an image of another composite result of the real image and the virtual scene, referring as example 2; and FIG. 9(*f*) shows a real-time tracking results of the image capturing unit 220 of the present disclosure in example 2. From FIG. 9, it is obvious that a satisfying composite result of the real image and the virtual scene as well as the representing of the moving trajectory of camera can be achieved.

Figure 10B:
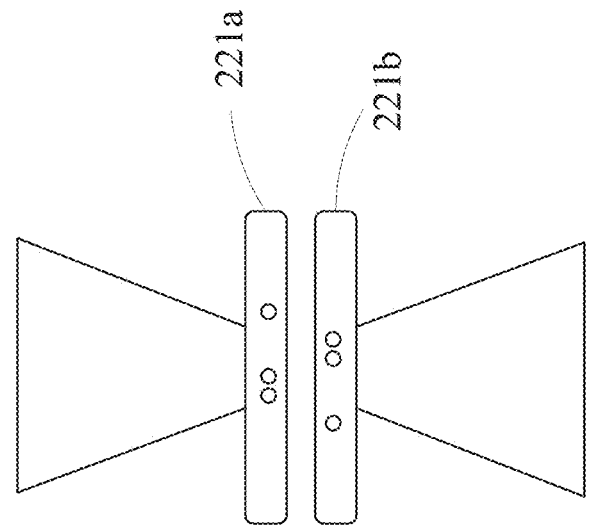
FIG. 10B is a schematic diagram showing two depth maps obtained from two exemplary depth cameras that are orientated facing opposite directions of different visual fields according to an embodiment of the present disclosure.
Figure 10A:
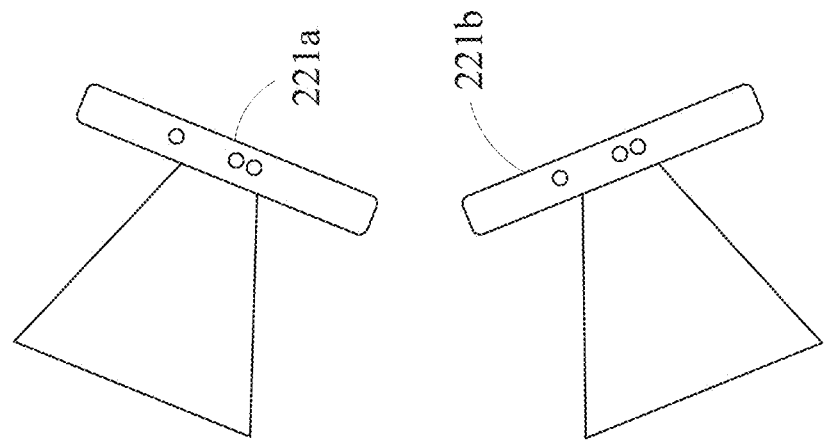
FIG. 10A is a schematic diagram showing two depth maps obtained from two exemplary depth cameras that are orientated at different angles of different visual fields according to an embodiment of the present disclosure.

Since the field of view of each depth camera is limited by about 57 degrees and the real object is generally being illuminated by high-power lighting in the shooting, the depth information acquired from the depth camera may not be perfect and thus the precision of the measured depth map can be adversely affected. Therefore, in order to enlarge the depth measurement range of the depth information generating unit 221, the depth information generating unit 221 in one embodiment of the present disclosure is configured with a plurality of depth cameras that are arranged facing to different directions to be used for generating different depth frames, while enabling the depth frames of those depth cameras to be composed into one depth map. In an embodiment of the present disclosure, the depth information generating unit 221 is configured with two depth cameras 221a and 221b, both having 57-degree field-of-view. As shown in FIG. 10A, the two depth cameras 221a and 221b are disposed on the same level while being orientated at different angles for facing different directions, so that two different depth frames of different field-of-view can be obtained. Thereby, an image registration process is performed upon the two depth frames using either a feature-point-based image stitching method or an assistant image calibration method, by that the depth frames can be combined into a depth map with larger field-of-view. In an embodiment shown in FIG. 10B that the two depth cameras 221a and 221b are disposed on the same level while being orientated at facing opposite directions, the so-obtained depth frames are required to processed by a normalization process so as to be combined into a depth map with larger field-of-view. Thereby, not only the depth measurement range and the field of view are enlarged, but also the operation stability of the whole system can be ensured since the positioning computation of those depth cameras facing different direction can be performed respectively and the results of the positioning computations can be averaged or used in an optimization operation.

The experiments provided hereinafter are performed for assuring the precision of the system and method provided in the present disclosure relating to the estimated positioning of camera that is compared with its actual moving trajectory. The experiments comprise an angular measurement and a displacement measurement, whereas each measurement comprises three sub-measurements in three different axial directions, i.e. X-axis, Y-axis and Z-axis.

In the angular measurement, an actual camera is mounted on an electric rotary plate for simulating a rotating of the camera about its Y-axis that is enabled by a cameraman, and simultaneously a precision angular variation of the rotating can be obtained by the detection of an electric device. At the same time, the movements in X-axis direction and Z-axis direction of the actual camera are detected and obtained by an electronic level disposed above the actual camera. The experimental result is provided in the Table 1, in which the absolute difference between each estimated angle from the system of the present disclosure and the angle of actual measurement is obtained in a degree-by-degree manner and the plural such absolute differences are averaged. As shown in Table 1, the system and method of the present disclosure can provide satisfactory precisions in X-axis and Y-axis measurements, but not so perfect in Z-axis rotating. However, there is no so much Z-axis rotating in actual shooting.

TABLE 1

Rotating Error Measurement

| | Actual angle measurement (degree) | Estimated angle (degree) | Error per one degree | Average error per one degree |
|---|---|---|---|---|
| $\theta'_x$ | 0.00 | −0.05~0.05 | 0.00 | +−0.03 |
| | 3.00 | 3.02 | 0.01 | |
| | 5.00 | 5.50 | 0.10 | |
| | 10.00 | 10.10 | 0.01 | |
| | 16.20 | 15.80 | −0.02 | |
| $\theta'_y$ before calibration | −5.00 | −4.50 | −0.10 | +−0.13 |
| | 5.00 | 4.30 | −0.14 | |
| | 10.00 | 8.70 | −0.13 | |
| | −10.00 | −8.60 | −0.14 | |

TABLE 1-continued

Rotating Error Measurement

| | Actual angle measurement (degree) | Estimated angle (degree) | Error per one degree | Average error per one degree |
|---|---|---|---|---|
| $\theta'_y$ after calibration | 10.00 | 9.90 | −0.01 | +−0.01 |
| | −10.00 | −9.90 | −0.01 | |
| $\theta'_z$ | 10.00 | 9.70 | −0.03 | +−0.07 |
| | 15.00 | 13.70 | −0.09 | |
| | 20.00 | 18.70 | −0.07 | |
| | 23.80 | 21.70 | −0.09 | |

In the displacement measurement, it is performed by mounting an actual camera on rail for simulating the doly or displacement of the actual camera enabled by a cameraman, i.e. the displacement of the camera in X-axis or Z-axis directions. In addition, the displacement is measured by the use of a laser ranger. The experimental result is provided in the Table 2, in which the absolute difference between each estimated displacement from the system of the present disclosure and the displacement of actual measurement is obtained and the plural such absolute differences are averaged. As shown in Table 1, the system and method of the present disclosure can provide satisfactory precisions, that is, for each 1 cm displacement, the error is less than 0.04 cm.

TABLE 2

Displacement Error Measurement

| | Actual displacement (cm) | Estimated displacement | Error per one centimeter | Average error per one centimeter |
|---|---|---|---|---|
| $t'_x$ | 0.00 | 0.05 | 0.05 | +−0.04 |
| | 5.00 | 5.01 | 0.00 | |
| | 10.00 | 10.80 | 0.08 | |
| | 15.00 | 15.83 | 0.06 | |
| | 20.00 | 21.60 | 0.08 | |
| | 25.00 | 25.71 | 0.03 | |
| | 30.00 | 30.80 | 0.03 | |
| | 35.00 | 36.10 | 0.03 | |
| | 40.00 | 41.50 | 0.04 | |
| | 45.00 | 46.80 | 0.04 | |
| | 50.00 | 52.00 | 0.04 | |
| $t'_y$ | 0.00 | 0.07 | 0.07 | +−0.04 |
| | 5.50 | 5.30 | −0.04 | |
| | 7.00 | 7.16 | 0.02 | |
| | 13.50 | 14.00 | 0.04 | |
| | 18.00 | 19.30 | 0.07 | |
| | 25.00 | 26.02 | 0.04 | |
| | 26.00 | 27.00 | 0.04 | |
| | 35.00 | 33.12 | −0.05 | |
| | 41.50 | 41.50 | 0.00 | |
| $t'_z$ | 0.00 | 0.10 | 0.10 | +−0.04 |
| | 5.00 | 4.96 | 0.00 | |
| | 10.00 | 10.85 | 0.09 | |
| | 15.00 | 15.32 | 0.02 | |
| | 20.00 | 20.04 | 0.00 | |
| | 25.00 | 24.53 | −0.05 | |
| | 30.00 | 29.35 | 0.02 | |
| | 40.00 | 38.90 | 0.03 | |
| | 50.00 | 48.60 | 0.03 | |

To sum up, the present disclosure relates an image composition system 200 and method 300, in which information from depth cameras is used for enabling camera trajectories to be represented in a virtual scene at the time when the real scene is taken while allowing the representation of a real scene to merge into the virtual scene perfectly, and thus a preview of virtual-real image composition can be achieved right at the film studio. Thereby, the cost of multimedia post-production of virtual-real synthesis can be greatly reduced, and also the trajectory information insufficiency relating to the tracking of camera or parameter registration error can be prevented in early stage.

With respect to the above description then, it is to be realized that the optimum dimensional relationships for the parts of the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present disclosure.

What is claimed is:

1. An image composition system, comprising:
   an image capturing unit, configured for capturing at least one first image of a real object;
   a depth information generating unit, disposed on the image capturing unit and configured for measuring a depth information between the depth information generating unit and the real object;
   a computing unit,
      receiving the at least one first image and the depth information,
      performing a computation of removing a noise caused by a moving object other than the real object from the received depth information by
         (1) obtaining a skeleton model of a figure from a depth map while removing an area where the skeleton model exists from the depth map, and
         (2) utilizing the depth maps generated at different times to extract and remove areas relating to the moving object, and
      computing a moving trajectory of the image capturing unit; and
   a composition unit, compositing the at least one first image and a second image of a virtual scene so as to achieve a composited result while displaying the composited result on a display unit.

2. The image composition system of claim 1, wherein the image capturing unit comprises a depth camera or a plurality of color cameras.

3. The image composition system of claim 1, wherein the computing unit is enabled to compute and obtain the position and rotation angle of the depth information generating unit according to the received depth information to be used in a conversion for obtaining the position and rotation angle of the image capturing unit.

4. The image composition system of claim 1, wherein the depth information generating unit comprises a plurality of depth cameras, and the plural depth cameras are orientated facing different directions.

5. An image composition method, comprising the steps of:
   capturing at least one first image of a real object by a moving image capturing unit;
   measuring a depth information between the depth information generating unit and the real object by a depth information generating unit disposed on the image capturing unit;
   performing a computation of removing a noise caused by a moving object other than the real object from the depth information according to the at least one first image and the depth information to be used for computing and obtaining a moving trajectory of the image capturing unit; and
   compositing the at least one first image of the real object and a second image of a virtual scene according to the obtained moving trajectory of the image capturing unit;
   wherein, the depth information generating unit comprises at least one depth camera or a plurality of color cameras, and the depth information measured and obtained by the at least one depth camera or the plural color cameras is substantially a depth map containing information relating to the distance of the surfaces of any two neighboring points on the real object from the depth information generating unit,
   wherein the removing of the noise further comprises the steps of:
      (1) obtaining a skeleton model of a figure from the depth map while removing an area where the skeleton model exists from the depth map; and
      (2) utilizing depth maps generated at different times to extract and remove areas relating to the moving object.

6. The image composition method of claim 5, wherein the at least one depth camera comprises a plurality of depth cameras.

7. The image composition method of claim 6, wherein the depth cameras are orientated facing different directions.

8. The image composition method of claim 5, wherein the computing and obtaining of the moving trajectory of the image capturing unit further comprises the steps of:
   computing and obtaining the position and rotation angle of the depth information generating unit according to the received depth information to be used in a conversion for obtaining the position and rotation angle of the image capturing unit.

9. The image composition method of claim 5, wherein the removing of noise further comprises the steps:
   (1) dividing the depth map into an array of a plurality of depth frames;
   (2) randomly excluding the depth frames with distances of the surfaces of any two neighboring points on the real object from the depth information generating unit that are smaller than a specific threshold;
   (3) randomly sampling more than one depth frames from those depth frames that are not excluded to be used for computing a trajectory variation of the depth information generating unit;
   (4) computing and obtaining a moving trajectory of the image capturing unit based upon the trajectory variation of the depth information generating unit to be used in a calculation for comparing the consistency between the moving trajectory of the image capturing unit and the measured depth information; and
   (5) repeating the foregoing steps (1) to (4) for a specific number of times so as to acquire one set of sampling of the depth frames with optimal consistency to be used for computing the moving trajectory of the image capturing unit.

10. The image composition method of claim 5, further comprising the step of:
    optimizing the moving trajectory of the image capturing unit.

11. The image composition method of claim 10, wherein the computing of the moving trajectory of the image capturing unit further comprises the steps of:
    computing and obtaining a moving trajectory of the depth information generating unit based upon the measured depth information to be used in a conversion for obtaining the moving trajectory of the image capturing unit;

and further the optimizing of the moving trajectory of the image capturing unit comprises the steps of:
(1) computing and obtaining the moving trajectory of the depth information generating unit based upon the measured depth information, and after setting the moving trajectory as an initial value of a feature tracking algorithm, enabling the feature tracking algorithm to be executed;
(2) extracting a plurality of feature points from each of the at least one first image that is captured by the image capturing unit to be used in a comparison for obtaining the corresponding relationship between the plural feature points in any two of the at least one first image; and
(3) calibrating the moving trajectory of the image capturing unit.

12. The image composition method of claim 5, wherein the second image of the virtual scene is obtained and provided by a virtual camera; and the method further comprising the step of:
adjusting a moving trajectory of the virtual camera and the operation status of the virtual camera according to the moving trajectory of the image capturing unit.

13. The image composition method of claim 12, wherein the status of the virtual camera comprising the following parameters of: spatial position, rotation angle, focal length, negative plate size, and resolution.

\* \* \* \* \*